(12) United States Patent
Wang et al.

(10) Patent No.: US 7,818,744 B2
(45) Date of Patent: Oct. 19, 2010

(54) APPARATUS AND METHOD FOR REDUNDANT SOFTWARE THREAD COMPUTATION

(75) Inventors: Cheng C. Wang, Sunnyvale, CA (US); Youfeng Wu, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 1329 days.

(21) Appl. No.: 11/325,925

(22) Filed: Dec. 30, 2005

(65) Prior Publication Data

US 2007/0174837 A1 Jul. 26, 2007

(51) Int. Cl.
*G06F 9/46* (2006.01)
*G06F 5/00* (2006.01)

(52) U.S. Cl. .......................... 718/100; 710/52; 710/56
(58) Field of Classification Search .................. 718/100; 712/216, 218, 220, 225, 239, 244, 248; 711/126; 714/13, 15, 51, 60, 734; 710/52, 56
See application file for complete search history.

(56) References Cited

U.S. PATENT DOCUMENTS

| 6,598,122 | B2* | 7/2003 | Mukherjee et al. ........... 711/126 |
|---|---|---|---|
| 6,757,811 | B1* | 6/2004 | Mukherjee ................... 712/220 |
| 6,792,525 | B2* | 9/2004 | Mukherjee et al. ........... 712/244 |
| 6,823,473 | B2* | 11/2004 | Mukherjee ................... 714/10 |
| 6,854,051 | B2* | 2/2005 | Mukherjee ................... 712/248 |
| 6,854,075 | B2* | 2/2005 | Mukherjee et al. ............ 714/51 |
| 7,243,262 | B2* | 7/2007 | Mukherjee et al. ............ 714/15 |
| 7,353,365 | B2* | 4/2008 | Mukherjee et al. .......... 712/218 |
| 7,373,548 | B2* | 5/2008 | Reinhardt et al. ............. 714/13 |
| 7,444,497 | B2* | 10/2008 | Reinhardt et al. ........... 712/218 |
| 7,581,152 | B2* | 8/2009 | Mukherjee et al. .......... 714/734 |
| 2001/0034854 | A1* | 10/2001 | Mukherjee ...................... 714/5 |
| 2001/0037447 | A1* | 11/2001 | Mukherjee et al. .......... 712/239 |
| 2002/0023202 | A1* | 2/2002 | Mukherjee ................... 712/225 |
| 2005/0193283 | A1* | 9/2005 | Reinhardt et al. ............. 714/48 |

OTHER PUBLICATIONS

Liu, J., et al., "Performance RDMA-Based MPI Implementation over InfiniBand," ICS, San Francisco, CA, Jun. 23-26, 2003, pp. 295-304.

* cited by examiner

*Primary Examiner*—Van H Nguyen
(74) *Attorney, Agent, or Firm*—Blakely, Sokoloff, Taylor & Zafman LLP

(57) ABSTRACT

An apparatus and method for redundant transient fault detection. In one embodiment, the method includes the replication of an application into two communicating threads, a leading thread and a trailing thread. The trailing thread may repeat computations performed by the leading thread to detect transient faults, referred to herein as "soft errors." A first in, first out (FIFO) buffer of shared memory is reserved for passing data between the leading thread and the trailing thread. The FIFO buffer may include a buffer head variable to write data to the FIFO buffer and a buffer tail variable to read data from the FIFO buffer. In one embodiment, data passing between the leading thread data buffering is restricted according to a data unit size and thread synchronization between a leading thread and the trailing thread is limited to buffer overflow/underflow detection. Other embodiments are described and claimed.

15 Claims, 15 Drawing Sheets

```
Function ENQUEUE  300
Input: data_in

ENQUEUE(data_in) {

// put data into buffer    ~310
    buffer [ queueHead ] = data_in;
                 ~312

// get nextHead    ~320
    nextHead = ( queueHead + 1 ) % Q_SIZE;
                   ~312

// overflow checking    ~330
    while ( nextHead == queueTail );
                              ~412

// advance queue head    ~340
    queueHead = nextHead;
       ~312       ~322
}
```

```
Function DEQUEUE  400
Input: data_out

DEQUEUE() {

// underflow checking    ~410
    while ( queueTail == queueHead );
               ~412          ~312

// get data from buffer    ~420
    data_out = buffer [ queueTail ];
                           ~412

// advance queue tail    ~430
    queueTail = ( queueTail + 1 ) % Q_SIZE;
}
```

FIG. 2

```
Function ENQUEUE   300
Input: data_in

ENQUEUE(data_in) {

// put data into buffer   ~310
    buffer [ queueHead ] = data_in;
               ~312

// get nextHead   ~320
    nextHead = ( queueHead + 1 ) % QUEUE_SIZE;
       ~322        ~312              ~350

// overflow checking   ~330
    while ( nextHead == queueTail_L )
                             ~352
        // update queueTail_L with queueTail
        queueTail_L = queueTail;
          ~352        ~412

// advance queue head   ~340
    queueHead = nextHead;
}
```

```
Function DEQUEUE   400
Input: data_out

DEQUEUE() {

// underflow checking   ~410
    while ( queueTail == queueHead_L )   ~450
      ~412                  ~452
        // update queueHead_L with queueHead
        queueHead_L = queueHead;
           ~452        ~312

// get data from buffer   ~420
    data_out = buffer [ queueTail ];
                          ~412

// advance queue tail   ~430
    queueTail = ( queueTail + 1 ) % Q_SIZE;
                   ~412 return data_out;
}
```

FIG. 4

```
Function ENQUEUE    300
Input: data_in

ENQUEUE(data_in) {

// put data into buffer ~310
    buffer [ queueHead_L ] = data_in;
                        ~354
    // advance local queue head ~320
    queueHead_L = ( queueHead_L + 1 ) % QUEUE_SIZE;
                        ~354
    // check data unit ~360
    if ( queueHead_L % DATA_UNIT == 0 ) {
                                    ~362
        // overflow checking ~330
        while ( queueHead_L == queueTail );

advance queue head ~340
        queueHead = queueHead_L;
    }
}
```

```
Function DEQUEUE    400
Input: data_out

DEQUEUE() {

// check data unit ~460
    if ( queueTail_L % DATA_UNIT == 0 ) {
                                    ~462
        // update queue tail in DATA_UNIT unit ~470
        queueTail = queueTail_L;
        ~412      ~454
        // underflow checking ~410
        while ( queueTail_L == queueHead );
                    ~454            ~312
    }
    // get data from buffer ~420
    data_out = buffer [ queueTail_L ];
                            ~454
    // advance local queue tail ~430
    queueTail_L = ( queueTail_L - 1 ) % Q_SIZE;

return data_out;
}
```

FIG. 9

```
Function ENQUEUE    300
Input: data_in

ENQUEUE(data_in) {

// put data into buffer  ~310
  buffer [ queueHead_L ] = data_in;
                            ~354

// advance local queue head  ~320
  queueHead_L = ( queueHead_L + 1 ) % QUEUE_SIZE;
                    ~354

// check data unit  ~360
  if ( queueHead_L % DATA_UNIT == 0 ) {
          ~354               ~362

// block when buffer full  ~330
    while ( queueHead_L == queueTail_L )
              ~352              ~352
      queueTail_L = queueTail;
         ~354         ~412

// update queue head  ~340
    queueHead = queueHead_L;
       ~312        ~354
  }
}
```

```
Function DEQUEUE    400
Input: data_out

DEQUEUE() {

// check data unit  ~460
  if ( queueTail_L % DATA_UNIT == 0 ) {
                                ~462

// update queue tail  ~470
    queueTail = queueTail_L;
                   ~454

// block when buffer empty  ~410
    while ( queueTail_L == queueHead_L )   ~452
              ~454            ~452
      queueHead_L = queueHead;
         ~452         ~312
  }

// get data from buffer  ~420
  data_out = buffer [ queueTail_L ];
                         ~454

// advance local queue tail  ~430
  queueTail_L = ( queueTail_L + 1 ) % Q_SIZE;

return data_out;
}
```

FIG. 14

APPARATUS AND METHOD FOR REDUNDANT SOFTWARE THREAD COMPUTATION

FIELD

One or more embodiments relate generally to the field of integrated circuit and computer system design. More particularly, one or more of the embodiments relate to an apparatus and method for redundant software thread computation.

BACKGROUND

Modern microprocessors are vulnerable to transient hardware faults caused by alpha particles and cosmic rays. For example, cosmic rays can alter the voltage levels that represent data values in microprocessor chips. Strikes by cosmic ray particles, such as, neutrons, are particularly critical because of the absence of any practical way to protect microprocessor chips from such strikes. Although the energy flux of these rays can be reduced to acceptable levels with six feet or more of concrete, this width is significantly greater than normal computer room roofs or walls.

Furthermore, as transistors shrink in size with succeeding technology generations, they become individually more vulnerable to cosmic strikes. However, decreasing voltage levels and exponentially increasing transistor counts cause overall chip susceptibility to increase rapidly. To compound the problem, achieving a particular fail rate for large multiprocessor servers, requires an even lower failure rate for the individual microprocessors that comprise the multiprocessor server.

Currently, the frequency of such transient faults is low, making fault tolerant computers attractive only for mission-critical applications, such as, on-line transaction processing and space programs. Unfortunately, as indicated above, future microprocessors will be more prone to transient faults due to their smaller feature sizes, reduced voltage levels, higher transistor count and reduced noise margins. Accordingly, although fault tolerance systems are generally limited to mission-critical applications, future fault detection and recovery techniques, which are currently only used for mission critical systems, may become common in all but the least expensive microprocessor devices.

Several redundant thread (RT) based approaches are proposed to detect transient faults. The basic idea of these approaches is to replicate an application into two communicating threads, the leading thread and the trailing thread. The trailing thread repeats the computations performed by the leading thread, and the values produced by the two threads are compared for error detection. To reduce the performance impacts on the original program execution, the leading thread and the trailing thread should seek to run on different processor (cores) in a multiprocessor system (or many core) environment.

Unfortunately, the RT approach requires thread synchronization and data passing between the replicated threads on each shared memory access. Since memory access accounts for thirty percent of instructions in, for example, Intel architecture 32-bit (IA32) programs, the interprocessor (or inter core) communication and synchronization overhead becomes a substantial challenge. Existing techniques generally depend on special hardware to support the reduced overhead.

Jiuxing Li, Jiesheng Wu, Dhabaleswar K. Panda, "High Performance RDMA-based MPI Implementation over Infini-Band", In Proceedings of the 17$^{th}$ Annual International Conference on Supercomputing, 2003, presents a remote direct memory access (RDMA)-based data communication approach to reduce the overhead in message passing between threads. The approach works on a distributed memory system where all the data communications are explicit through either a message passing interface (MPI) or RDMA write. Conversely, in a shared memory system, all the data communications may be implicit through the hardware cache coherence protocol. The underlining data communication mechanisms for these two approaches are so different that the RDMA approach cannot solve the problems of redundant data transfer and false sharing.

BRIEF DESCRIPTION OF THE DRAWINGS

The various embodiments of the present invention are illustrated by way of example, and not by way of limitation, in the figures of the accompanying drawings and in which:

FIG. 2 is a diagram illustrating pseudo code for implementation of a circular queue as the shared memory, as shown in FIG. 1, in accordance with one embodiment.

FIG. 4 is a diagram illustrating pseudo code for providing a circular queue with lazy synchronization, in accordance with one embodiment.

FIG. 9 is a diagram illustrating pseudo code for providing a circular queue with delayed buffering, in accordance with one embodiment.

FIG. 14 is a diagram illustrating pseudo code for implementing a circular queue with combined lazy synchronization and delayed buffering, in accordance with one embodiment.

DETAILED DESCRIPTION

An apparatus and method for redundant software thread computation are described. In one embodiment, the method includes the replication of an application into two communicating threads, a leading thread and a trailing thread. In one embodiment, the trailing thread repeats computations performed by the leading thread to, for example, detect transient software faults, which are referred to herein as "soft errors." A first in, first out (FIFO) buffer of shared memory is reserved for passing data between the leading thread and the trailing thread. The FIFO buffer may include a buffer head variable to write data to the FIFO buffer and a buffer tail variable to read data from the FIFO buffer. In one embodiment, passing data between the leading thread data buffering is restricted according to a data unit size and thread synchronization between a leading thread and the trailing thread is limited to the detection of buffer overflow/underflow.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
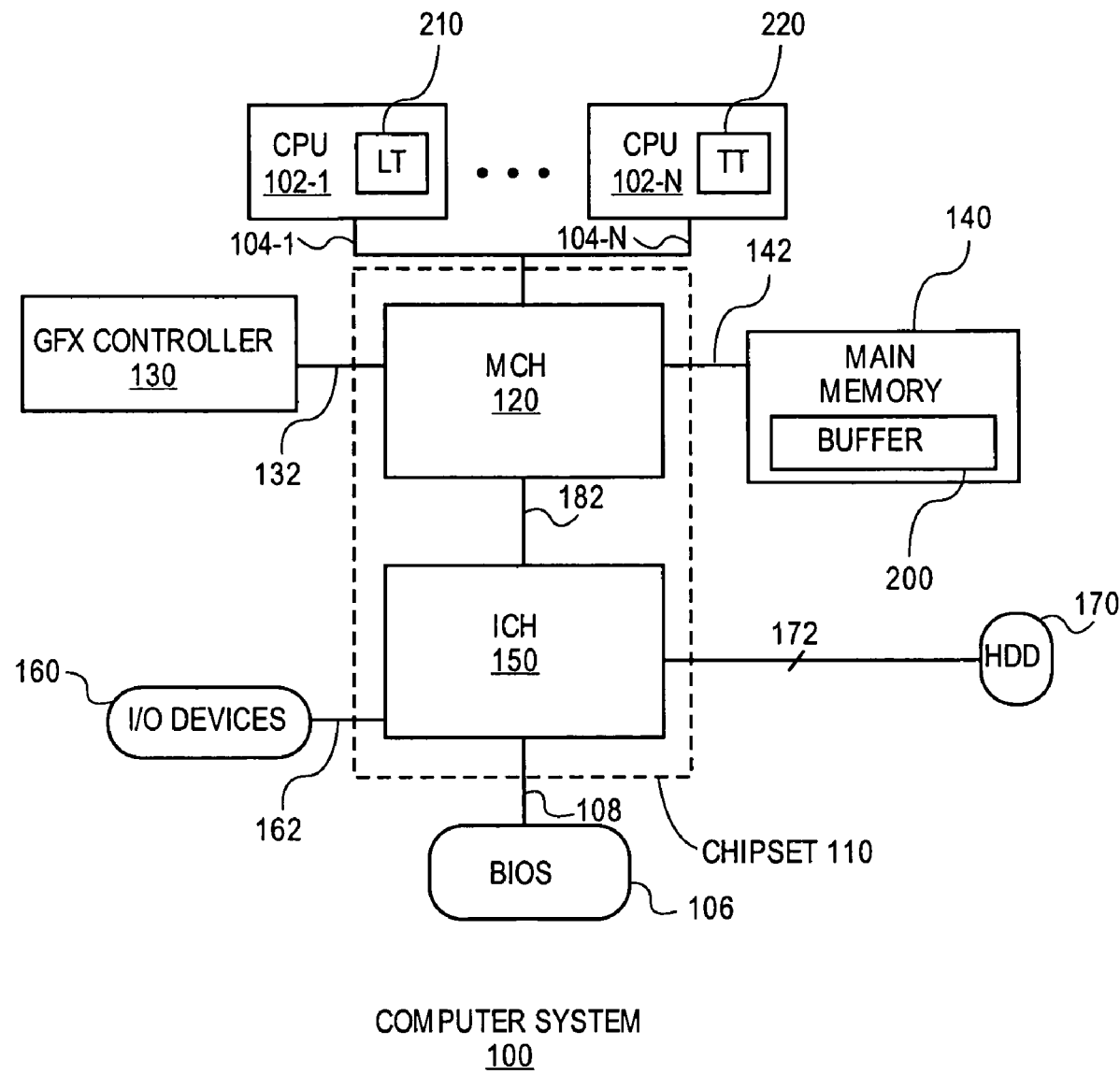
FIG. 1 is a block diagram illustrating a multiprocessor computer system, including a shared memory buffer to support redundant software thread computation, in accordance with one embodiment.

FIG. 1 is a block diagram illustrating a microprocessor computer system 100 including a shared memory buffer 200 to support redundant software thread computations, in accordance with one embodiment. Representatively, computer system 100 comprises a plurality of processor system buses (front side bus (FSB)) 104 (104-1, . . . , 104-N) for communicating information between a plurality of processors (CPU) 102 (102-1, . . . , 102-N) and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 may include memory controller hub (MCH) 120 coupled to graphics (GFX) controller 130 via an interconnect 132. In an alternative embodiment, GFX controller 120 is integrated into MCH 120 such that, in one embodiment, MCH 120 operates as an integrated graphics MCH (GMCH). Representatively, MCH 120 is also coupled to main memory 140 via interconnect 142. In one embodiment, main memory 140 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset may include an input/output (I/O) controller hub (ICH) 150. Representatively, ICH 150 may include a universal serial bus (USB) link or interconnect 162 to couple one or more I/O devices 160 to ICH 150. In an alternative embodiment, 110 devices 160 may be coupled to ICH 150 via a point-to-point link, including, but not limited to, peripheral component interconnect (PCI) Express (PCI-Express) or other like point-to-point interconnect. Likewise, a serial advance technology attachment (SATA) 172 may couple hard disk drive devices (HDD) 170 to ICH 150. In one embodiment, basic input/output system (BIOS) 106 initializes computer system 100.

Although chipset 110 is illustrated as including a separate MCH 120 and ICH 150, in one embodiment, MCH 120 may be integrated within CPU 102. In an alternative embodiment, the functionality of MCH 120 and ICH 150 are integrated within chipset 110. In one embodiment, shared memory buffer 200 may be implemented within computer systems including an MCH integrated within a CPU, an MCH and ICH integrated within a chipset, as well as a system on-chip. Accordingly, those skilled in the art should recognize that FIG. 1 is provided to illustrate one embodiment and should not be construed in a limiting manner.

In one embodiment, computer system 100 may implement a dual processor system. In accordance with such an embodiment, a first processor 102-1 executes a leading thread (LT) 210 and a second processor 102-2 executes a trailing thread (TT) 220 to provide a redundant thread (RT) implementation to detect transient faults. As described herein, "transient faults" may refer to hardware faults caused by alpha particles and cosmic rays, which may alter voltage levels resulting in temporary or transient errors, referred to herein as "soft errors".

To enable transient fault detection, in one embodiment, an application is replicated between the two communicating threads: LT 210 and TT 220. In accordance with this RT-based approach, TT 220 repeats computations performed by the LT 210 and values produced by the two threads are compared for error detection. Unfortunately, the RT-based approach requires thread synchronization and data passing between the replicated threads on each shared memory access. Since memory access accounts for thirty percent of instructions within, for example, 32-bit Intel architecture (IA32) programs, the interprocessor (or intercore communications and synchronization overhead) may become a distinct challenge.

In one embodiment, shared memory buffer 200 is provided to reduce overhead required to provide thread synchronization and data passing between LT 210 and TT 220. As described in further detail below, in one embodiment, shared memory buffer 200 may be implemented as a circular queue (CQ) with lazy synchronization (LS) and delayed buffering (DB) (CQ-LS/DB). In one embodiment, CQ 200 with LS and DB can reduce the data communication and synchronization overhead between a LT 210 and a TT 210 to provide a software redundant thread (SRT) approach.

Hence, the latency and bandwidth of the communication paths is important for the redundant thread (RT) based transient fault detection. Conventional approaches use special hardware buffer for communication and synchronization between the leading thread and the trailing thread. In one embodiment, CQ 200 with LS/DB provides an efficient software buffer for the thread communication and synchronization without special hardware support.

In one embodiment, synchronization overhead is reduced by restricting data passing from TT 220 to LT 210. As indicated, shared memory buffer 200 enables data passing from LT 210 to TT 220. In one embodiment, the buffer 200 is implemented as a Circular Queue (CQ) such that LT 210 writes data into CQ 200 at a queue head and the TT 220 needs data from CQ 200 at a queue tail. As a result, synchronization overhead is reduced by allowing LT 210 to write data into CQ 200 and continue the execution without waiting for the TT 220 to read the data.

FIG. 2 depicts pseudo code illustrating one embodiment of ENQUEUE 300 and DEQUEUE 400 operations on CQ 200 to provide an SRT computation. Representatively, ENQUEUE function 300 includes code to write data into CQ buffer 200, which is shown as item 310, code to get a next queue head, referred to as item 320, code to perform overflow checking, referred to as item 330, and code to advance the queue head, which is referred to as item 340. Likewise, DEQUEUE function 400 includes code sections for underflow checking, referred to as item 410, code sections for reading data from the buffer, referred to as item 420, and code to advance the queue tail, which is referred to as item 430.

In accordance with one embodiment, the reservation of the shared memory buffer between LT 210 and TT 220 requires LT 210 and TT 220 to share queue head variable 312 and queue tail variable 412. In the embodiment illustrated in FIG. 2, LT 210 maintains and handles updating of queue head variable 312, while TT 220 maintains and handles the updating of queue tail variable 412. As indicated by overflow checking section 330 and underflow checking section 410, thread synchronization between LT 210 and TT 220 is required when CQ is empty (through buffer underflow checking) or CQ 200 is full (through buffer overflow checking).

Although shared memory buffer is illustrated as a circular queue, in accordance with one embodiment, it should be recognized that the embodiments described herein for lazy synchronization and delayed buffering may be applied to other reserved portions of memory, whether configured as a circular queue or other like data structure configuration. Accordingly, in the embodiment illustrated in FIG. 2, the ENQUEUE operation 300 is performed by LT 210 to write data into CQ buffer 200 and the DEQUEUE operation 400 is performed by TT 220 to head data from CQ buffer 200. As indicated above, the queueHead variable 312 and queueTail variable 412 are the shared variables between LT 210 and TT 220 for buffer overflow and underflow checking.

Figure 3:
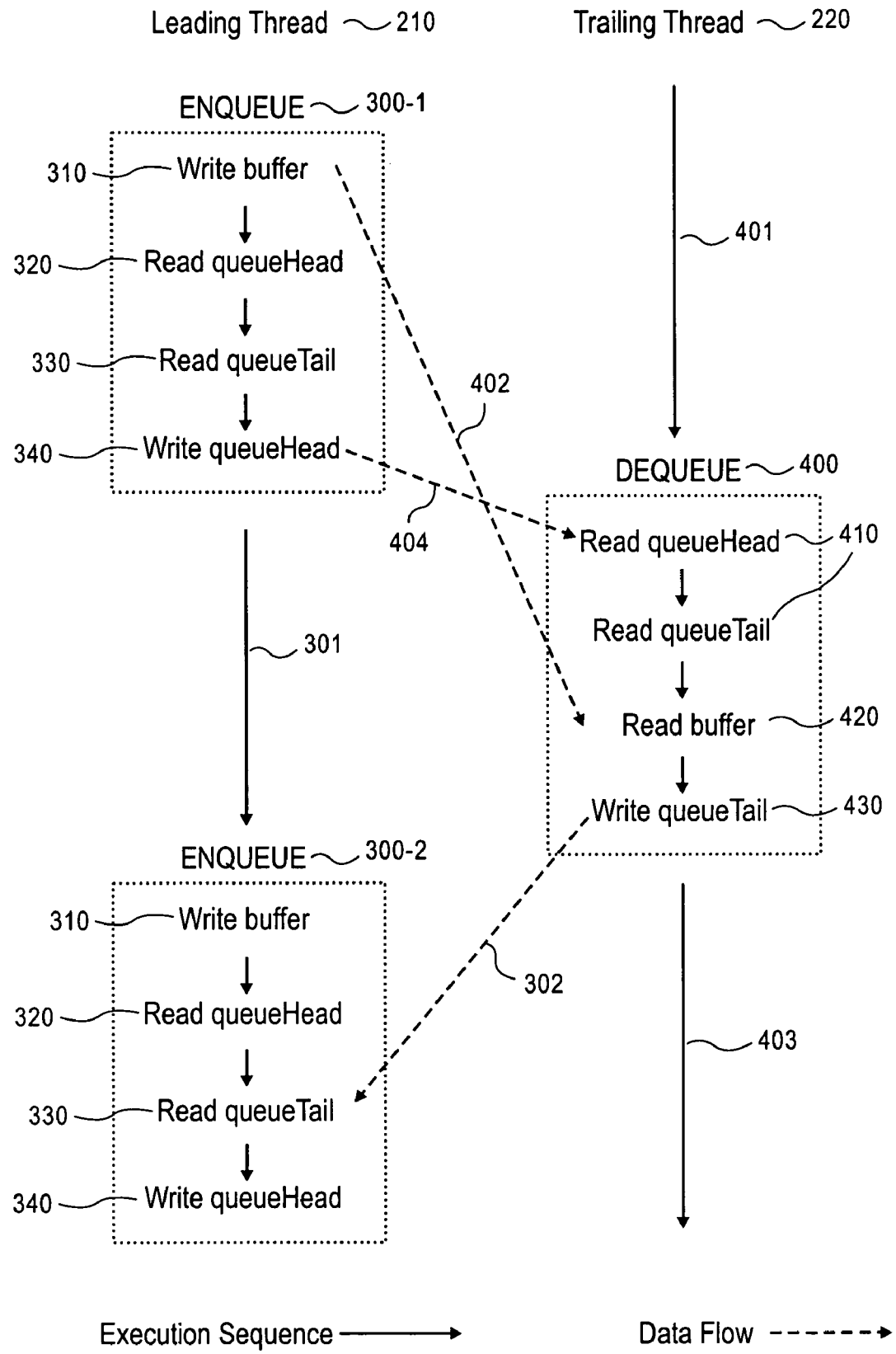
FIG. 3 is a block diagram illustrating data flows for communication between a leading thread and a trailing thread for redundant software thread computation, in accordance with one embodiment.

FIG. 3 is a block diagram illustrating data flows of queue head variable 312 and queue tail variable 412 between LT 210 and TT 220 for ENQUEUE operation 300 and DEQUEUE operation 400 to read/write data from CQ buffer 200. Representatively, ENQUEUE operation 300 initially writes to the buffer, as performed under heading 310 of ENQUEUE function 300, reads the queue head variable, as indicated by item 320, and reads the queue tail variable, as indicated by item 330, to perform overflow detection. The update to the queue head variable is indicated by item 340. Accordingly, the DEQUEUE operation 400 requires a data flow to read the queue head variable, as well as the queue tail variable, to perform underflow detection, as indicated by heading 410 of FIG. 2. The reading of data from the buffer 200, as indicated by item 420, and the subsequent updating of the queue tail variable 412, result in a further data flow 302 for a subsequent ENQUEUE operation by a leading thread or LT 210.

As illustrated in FIG. 3, n ENQUEUE and DEQUEUE operations require a total of 3*n data flows (cache miss in non-shared cache) between the LT 210 and TT 220. The variable n denotes the arbitrary number of data items entered into the CQ buffer 200 for the fault detection. In addition, synchronization overhead between LT 210 and TT 220 require 2*n data flows of queueHead and queueTail. In one embodiment, the synchronization overhead is reduced by limiting passing of queueHead variable 312 and queueTail variable 412 to buffer overflow/underflow detection, referred to herein as "lazy synchronization" (LS).

FIG. 4 is a block diagram further illustrating ENQUEUE function 300 and DEQUEUE function 400, as shown in FIG. 2, to provide lazy synchronization or LS within shared memory buffer 200, in accordance with one embodiment. To provide the lazy synchronization, code section heading 350 is added to update a local queueTail variable (queueTail_L) 352 with queueTail variable 412 maintained by TT 220. Correspondingly, pseudo code section 450 is added to DEQUEUE function 400 to update a local queueHead variable (queueHead_L) 452 according to queueHead variable 312 maintained by LT 210.

Accordingly, in one embodiment, buffer 200 is implemented as a Circular Queue with Lazy Synchronization (CQ-LS). To implement LS, in one embodiment, LT 210 keeps a local copy of queueTail variable 312 as queueTail_L variable 352 and the TT 220 keeps a local copy of queueHead variable 312 as queueHead_L variable 452, as shown in FIG. 4. Accordingly, in one embodiment, FIG. 4 illustrates pseudo code for ENQUEUE function 300 and DEQUEUE function 400 to provide lazy synchronization.

Representatively, in ENQUEUE operation 300, the LT 220 checks the buffer overflow with queueTail_L variable 352 instead of queueTail variable 312 so there is no data flow of queueTail variable 312. In DEQUEUE operation 400, the TT 220 checks buffer underflow with queueHead_L variable 352 instead of queueHead variable 350 so there is no data flow of queueHead.

Hence, in the embodiment shown in FIG. 4, LT 210 synchronizes queueTail_L variable 352 with queueTail variable 412 in a lazy way. In one embodiment, LT 210 updates queueTail_L variable 352 with queueTail variable 412 when the buffer overflow checking with queueTail_L variable 352 is true in the ENQUEUE operation 300 (see code section 310 and 350). Similarly, TT 220 updates queueHead_L variable 452 with queueHead variable 312 when the buffer underflow checking with queueHead_L variable 452 is true in the DEQUEUE operation 400 (see code sections 410 and 450). In this way, data flow of queueTail variable 412 on each ENQUEUE operation 300 and data flow of queueHead variable 312 on each DEQUEUE operation 400 can be avoided.

Figure 5:
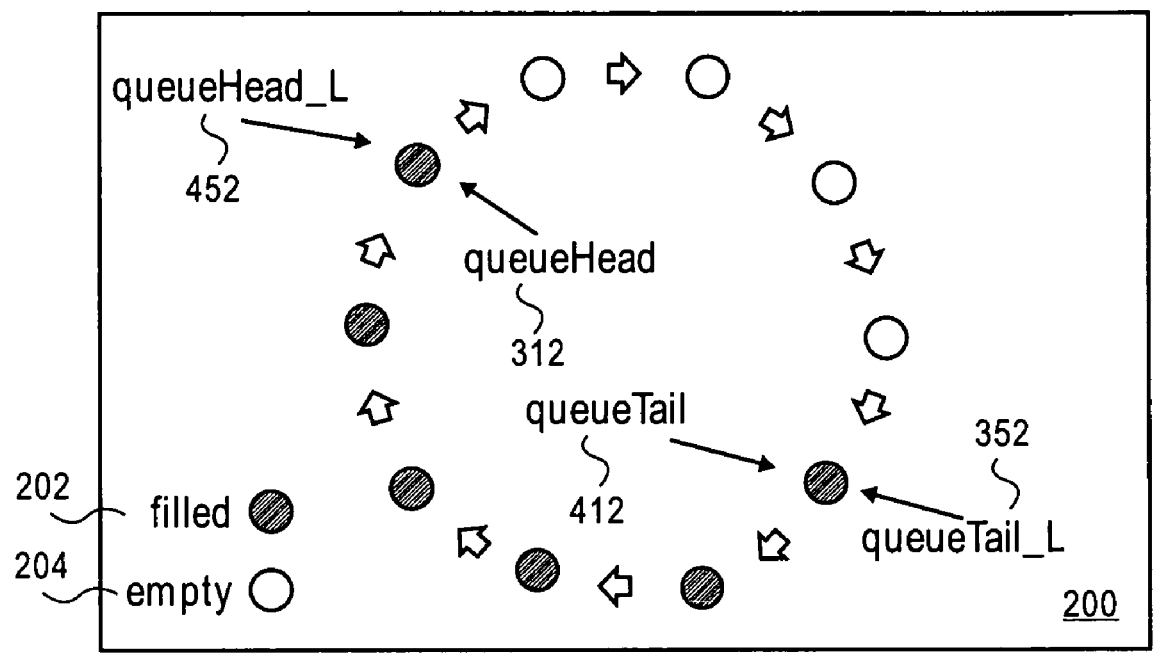
FIGS. 5-8 illustrate block diagrams depicting lazy synchronization for a circular queue, in accordance with one embodiment.
Figure 6:
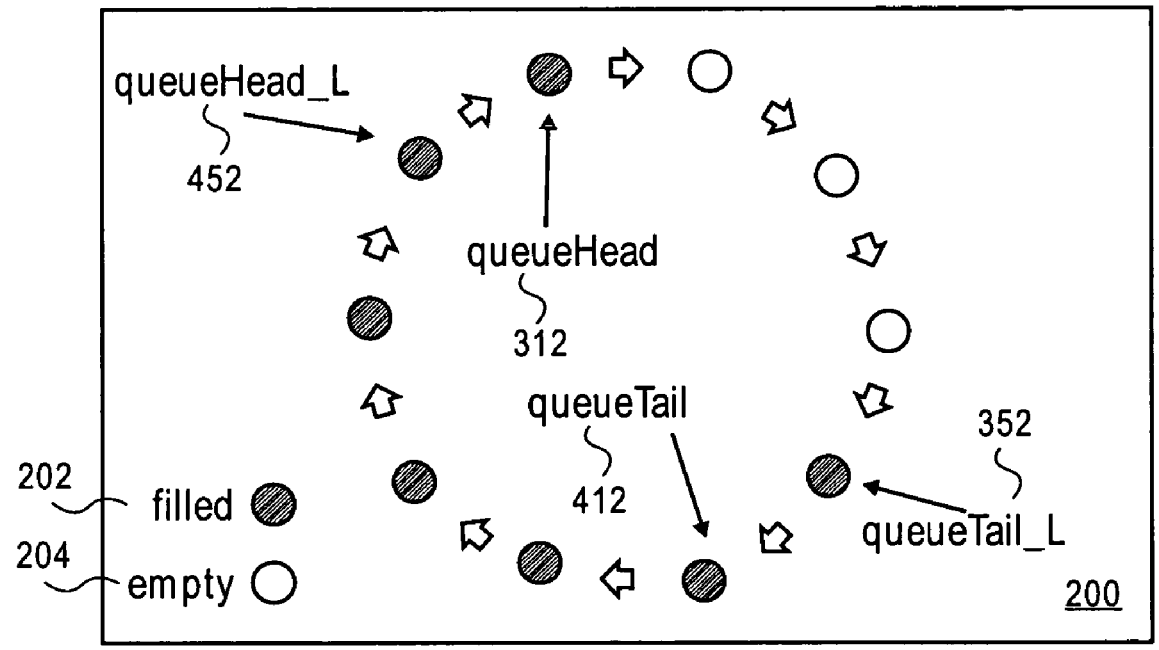

FIGS. 5-8 illustrate block diagrams depicting lazy synchronization for a circular queue, in accordance with one embodiment. In one embodiment, FIG. 5 shows the state of CQ-LS 200, where queueTail_L variable 352 keeps the local copy of queueTail variable 412 in LT 210 and queueHead_L variable 452 keeps the local copy of queueHead variable 312 in TT 220. FIG. 6 shows the resulting state after one ENQUEUE operation and one DEQUEUE operation. It will be recognized that after these operations, queueTail_L variable 352 and queueHead_L variable 452 are not updated to the corresponding queueTail variable 412 and queueHead variable 312.

Figure 7:
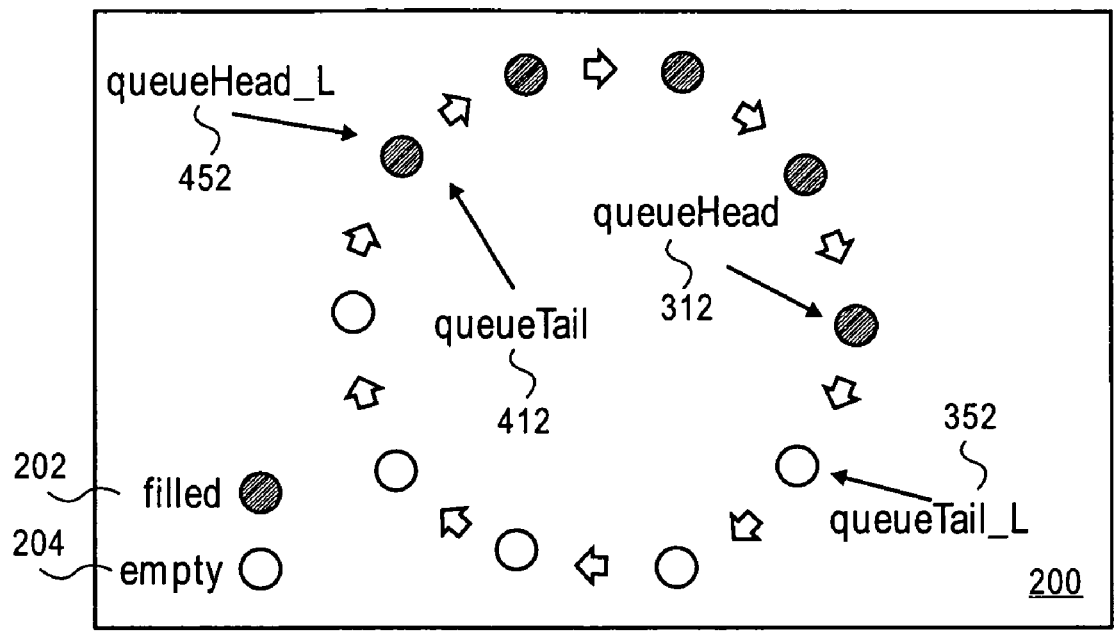
Figure 8:
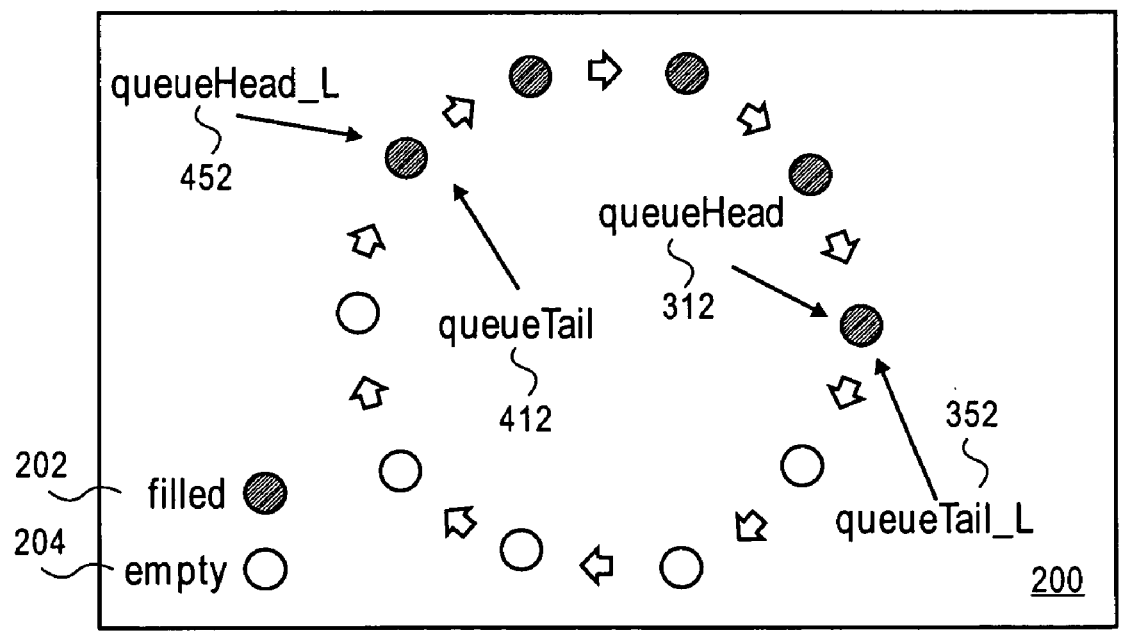

FIG. 7 shows the state where queueTail_L variable 352 must be updated for further ENQUEUE operation 300 because the buffer overflow checking with queueTail_L variable 352 is true, and queueHead_L variable 452 must be updated for further DEQUEUE operation 400 because the buffer underflow checking with queueHead_L variable 452 is true. FIG. 8 shows the state after the updating of queueTail_L variable 352 and queueHead_L variable 452 with the corresponding queueTail variable 412 and queueHead variable 312.

Accordingly, with the improved queue operations, for n ENQUEUE and DEQUEUE operations, in the best case of balanced queue operations, as shown in FIG. 5-8, the queueTail_L variable 352 and queueHead_L variable 452 are updated only once per half queue size of operations. So there are only 4*n/QUEUE_SIZE data flows for synchronization. Even in the worst case of unbalanced queue operations, there are only n+n/QUEUE_SIZE data flows for synchronization.

FIG. 9 depicts pseudo code for implementing a circular queue with delayed buffering, as provided within ENQUEUE function 300 and DEQUEUE function 400, according to one embodiment. Similar to the ENQUEUE function 300 and DEQUEUE function 400, as shown in FIG. 2, ENQUEUE function 300 and DEQUEUE function 400 include similar heading sections; however, check data unit section heading 360/460 is added to ENQUEUE function 300 and DEQUEUE function 400.

In accordance with such an embodiment, overflow checking and advancing of the queueHead variable 312 are delayed until an amount of data written/read from CQ buffer 200 equals a predetermined data unit size. Accordingly, in the embodiment illustrated, LT performs ENQUEUE operations using a local queue head variable (queueHead_L) 354. Similarly, in accordance with the embodiments shown in FIG. 9, TT 220 uses a local variable (queueTail_L) 454 for reading data from CQ buffer 200. The delaying of the updating of queue head variable 312 and queue tail variable 412, as well as overflow/underflow checking, is referred to herein as "avoiding false sharing," as described in further detail below.

Conventionally, writing to buffer 200 by LT 210 causes a read cache miss on TT 220. As a result, the cache coherence protocols transfer cache miss data in cache line unit. Although it is efficient to put the data into buffer 200 and get the data from buffer 200 in unit of at least cache line size to avoid fault sharing, a larger data unit than the cache line size is also helpful for data pre-fetching and hiding the cache miss latency.

In one embodiment, buffer 200 is implemented as a Circular Queue with Delayed Buffering (CQ-DB) to avoid false sharing and improve data pre-fetching. This technique is based on the fact that the threads check the buffer underflow or overflow through the shared variables queueHead 312 and queueTail 412. In one embodiment, buffer reads and writes may be performed to avoid false-sharing by delaying the updates to queueHead 312 and queueTail 412 such that they are updated according to DATA_SIZE unit 462. In one embodiment, data is read away from CQ buffer 200 in DATA_SIZE unit 362/462 and according to the assumption that the data is written into the buffer in DATA_SIZE unit 362/462. Accordingly, as shown in FIG. 9, two local variables are also needed: queueHead_L variable 354 in the LT 210 to keep queueHead variable 312 and queueTail_L variable 454 in TT 220 to keep queueTail variable 410.

Figure 10:
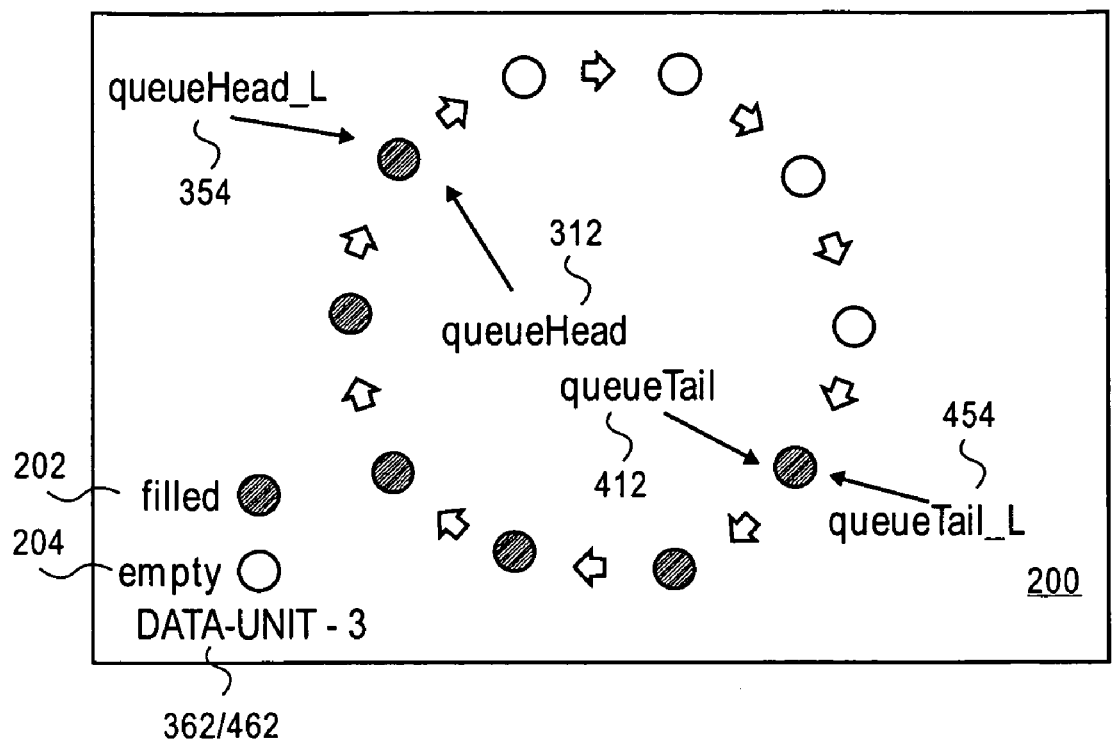
FIGS. 10-13 illustrate delayed buffering for a circular queue, in accordance with one embodiment.
Figure 11:
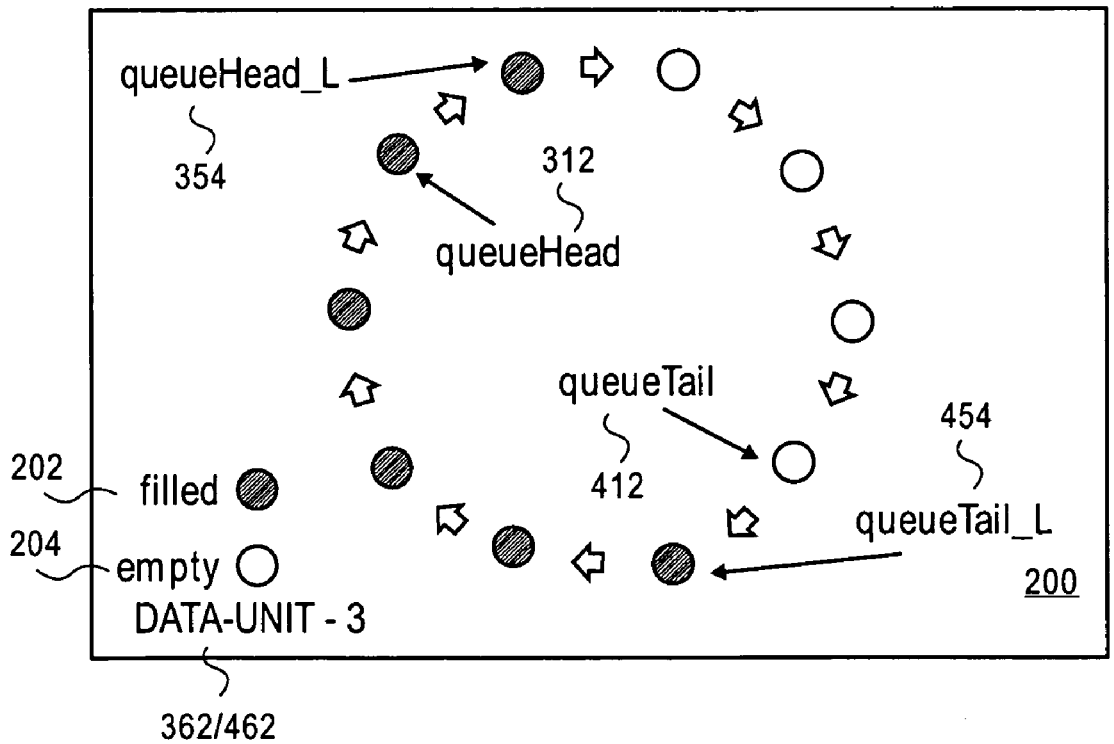
Figure 12:
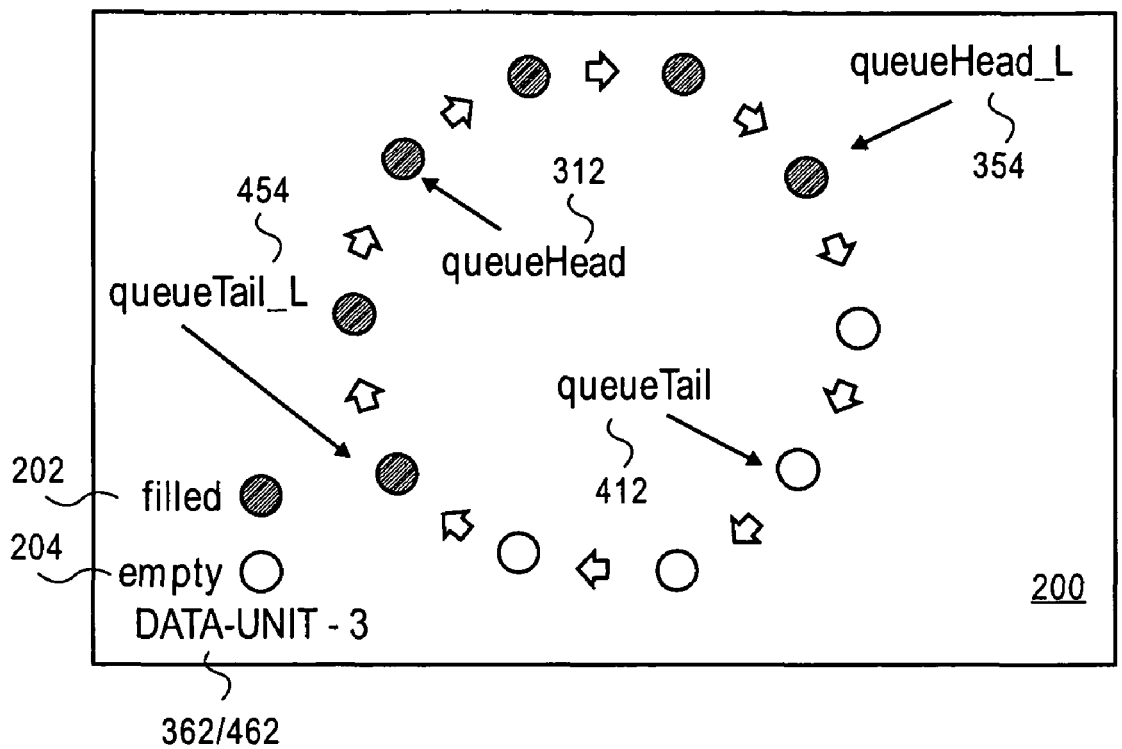
Figure 13:
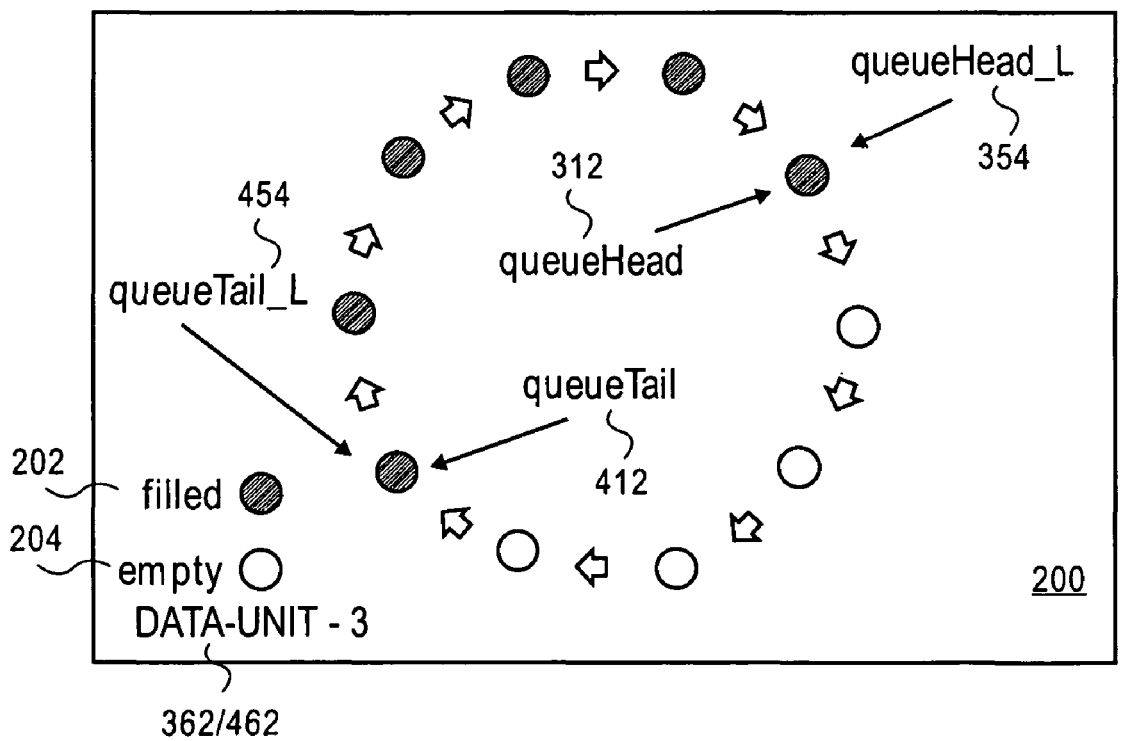

FIGS. 10-13 illustrate delayed buffering for a circular queue, in accordance with one embodiment. As an example, FIG. 10 shows the initial state of CQ-DB with DATA_UNIT=3. FIG. 11 shows the resulting state after an ENQUEUE operation and after a DEQUEUE operation. It will become apparent that the queueHead variable 312 and queueTail variable 412 are kept in queueHead_L variable 354 and queueTail_L variable 454, respectively. The update to the shared variables queueHead 312 and queueTail 412 are delayed. FIG. 12 shows the state before the update to queueHead variable 312 and queueTail variable 412. FIG. 13 shows the state after the update to queueHead and queueTail.

FIG. 14 is a diagram illustrating pseudo code for implementing a circular queue with combined lazy synchronization and delayed buffering, in accordance with one embodiment. Representatively, pseudo code, shown in FIG. 14, further illustrates ENQUEUE function 300 and DEQUEUE function 400 to combine the embodiments shown in the pseudo code, as illustrated in FIGS. 4 and 9. Representatively, LT reads data from buffer 200 according to queueHead_L variable 354, whereas TT 220 reads data from buffer 400 according to local queueTail_L variable 454. In addition, as shown in check data unit sections 360/460, buffer underflow detection and overflow detection are not performed unless an amount of data read/written to/from buffer 200 equals a predetermined data unit size.

Figure 15:
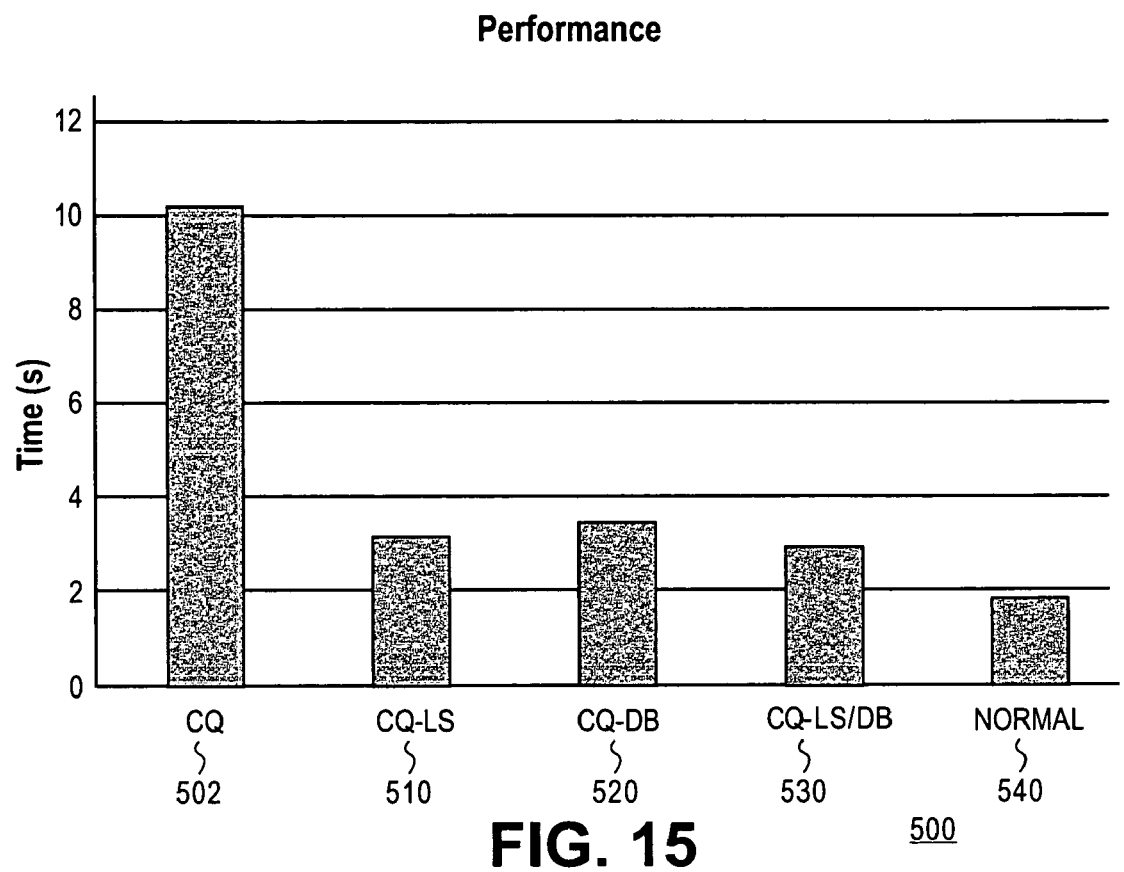
FIG. 15 is a block diagram illustrating performance results for comparison of various circular queue implementations, in accordance with one embodiment.

FIG. 15 is a block diagram illustrating performance results for comparison of various circular queue implementations, in accordance with one embodiment. FIG. 15 shows the performance result of a WC program (e.g., the word count (WC) utility program in Unix systems) for different techniques. The buffer size is 16 kilobytes (KB) and the DATA_UNIT is 256 byte. The program runs on a 3.6 gigahertz (GHz) dual processor system. The data NORMAL 540 is the normal program execution time without redundant thread. The data CQ 502 is the execution time for redundant thread with the straightforward implementation of circular queue (CQ).

In the embodiments shown in FIGS. 2, 4, 9 and 14, a lock is not used for protecting the shared memory access. In one embodiment, the code correctness for the shared memory access shown in FIGS. 2, 4, 9 and 14 relies on two conditions. First, each shared memory access is atomic. Second, the memory order should be in write order. In one embodiment, IA32 is used to satisfy these two conditions for aligned memory access.

Representatively, the data CQ-LS 510, CQ-DB 520 and CQ-LS/DB 530 are the execution time for redundant thread with different techniques. It is apparent that CQ-LS/DB 530 improves the performance of CQ 502 by about 3.6×. The overall program slow down is only about 52.6% for software redundant thread approach with CQ-LS/DB 530. This overhead can further be reduced when a faster communication mechanism is supported, e.g. shared caches between cores.

Figure 16:
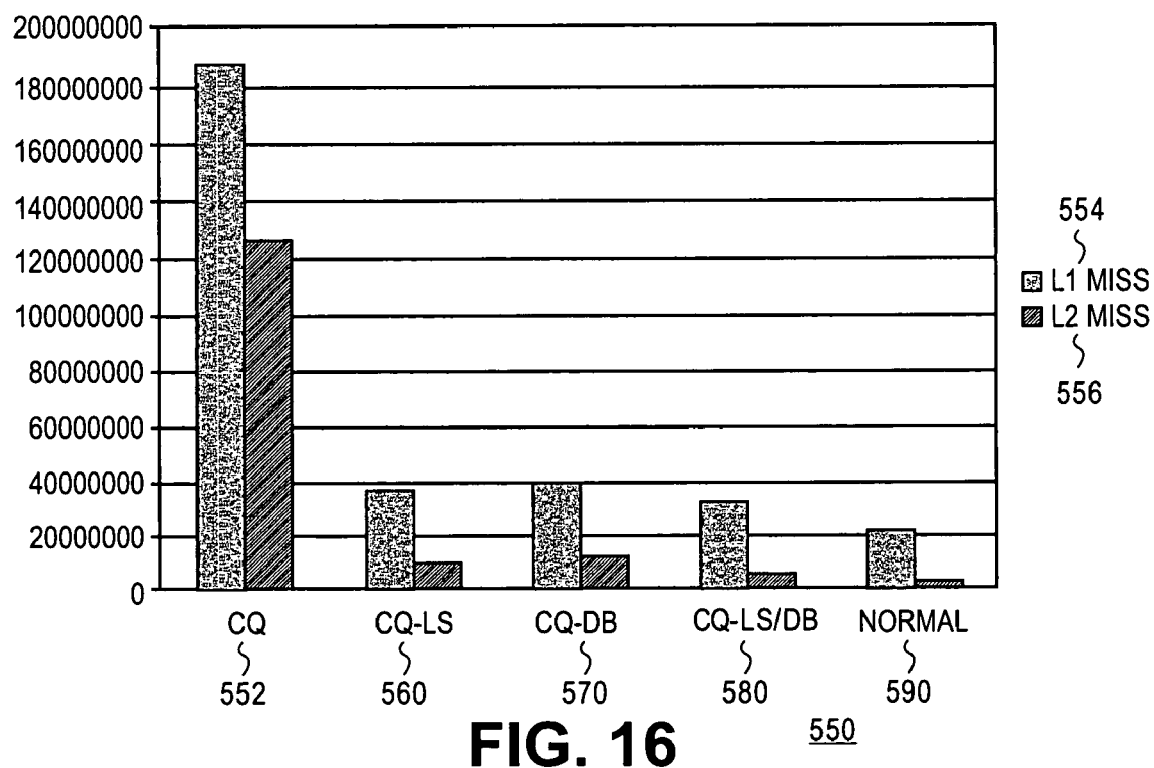
FIG. 16 is a block diagram illustrating a cache miss event according to the various circular queue implementations, in accordance with one embodiment.

FIG. 16 is a block diagram illustrating a cache miss event according to the various circular queue implementations, in accordance with one embodiment. FIG. 16 shows the corresponding cache miss event count collected using Intel VTune. It shows that, compared to CQ 552, the CQ-LS/DB 580 technique reduces level one (L1) cache miss by 83.2% and level two (L2) cache miss by 96%. Data for CQ-LS 560 and CQ-DB 560 is also shown. Procedural methods for implementing one or more of the above-described embodiments are now provided.

Figure 17:
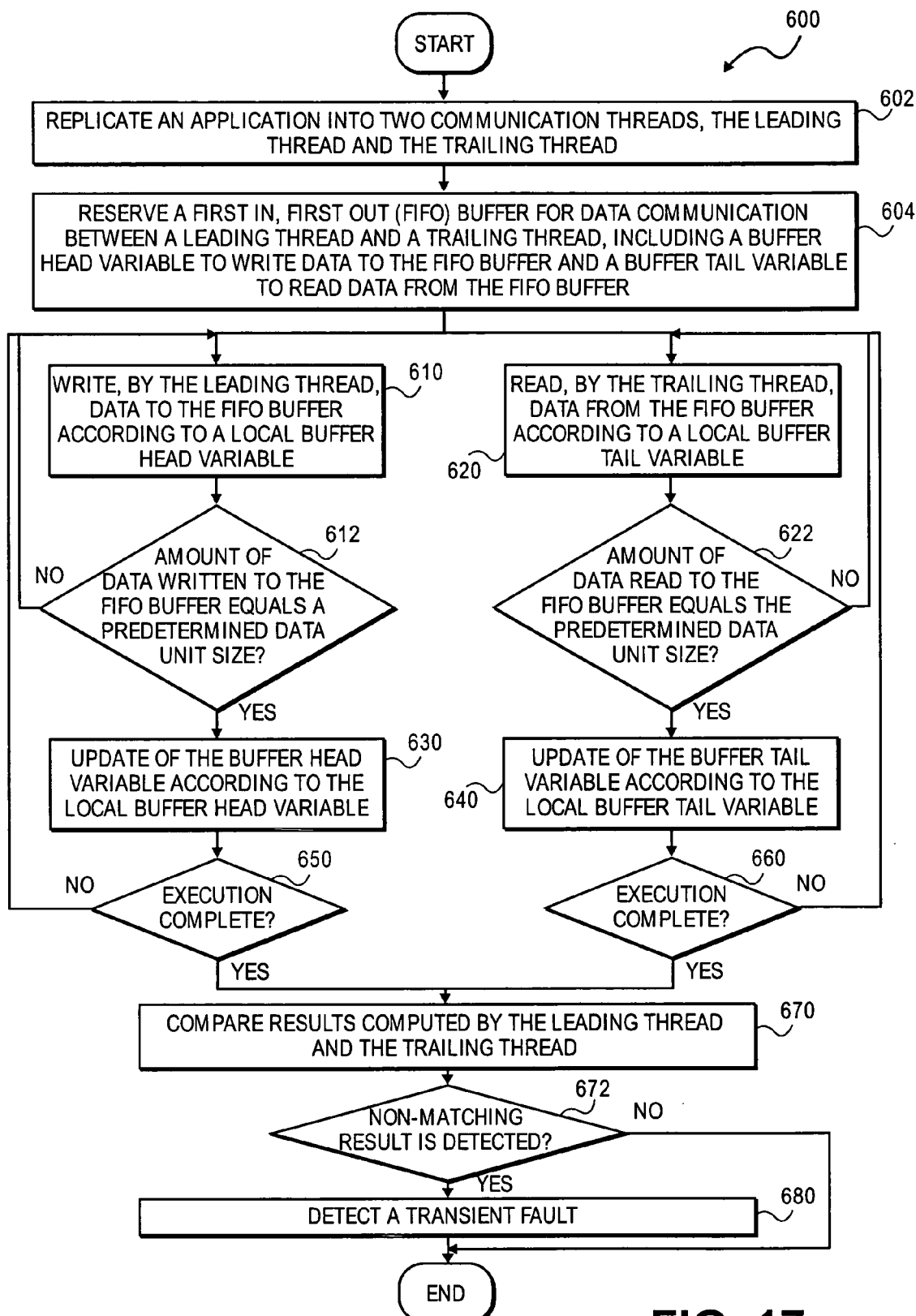
FIG. 17 is a flowchart illustrating a method for redundant thread software computation using a circular queue with delayed buffering, in accordance with one embodiment.

Turning now to FIG. 17, the particular methods associated with various embodiments are described in terms of computer software and hardware with reference to a flowchart. The methods to be performed by a computing device may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 17 is a flowchart illustrating a method 600 for redundant software computation, in accordance with one embodiment. In the embodiments described, examples of the described embodiments will be made with reference to FIGS.

1-16. However, the described embodiments should not be limited to the examples provided to limit the scope provided by the appended claims.

Referring again to FIG. 17, at process block 602, an application is replicated into two communicating threads: a leading thread and a trailing thread. Once replicated, at process block 604, a first in, first out (FIFO) buffer is reserved for communicating data between the leading thread and the trailing thread. In one embodiment, the FIFO buffer includes a buffer head variable to write data to the FIFO buffer and a buffer tail variable to read data from the buffer. Process blocks 610, 612, 630 and 650 illustrate execution by the leading thread, whereas process blocks 620, 622, 640 and 660 illustrate operations performed by the trailing thread.

At process block 610, the leading thread writes data to the FIFO buffer according to a local buffer head variable. At process block 612, it is determined whether an amount of data written to the FIFO buffer equals a predetermined data unit size. When such is the case, at process block 630, the buffer head variable is updated according to the local buffer head variable. In accordance with such an embodiment, the leading thread delays the update to the buffer head variable, which is maintained by the leading thread until the amount of data written to the FIFO buffer equals a predetermined data unit size.

As further illustrated in FIG. 17, at process block 620, the trailing thread reads data from the FIFO buffer according to a local buffer tail variable. At process block 622, it is determined whether an amount of data written to the FIFO buffer equals the predetermined data unit size. When such is the case, at process block 640, the trailing thread updates the buffer tail variable according to the local buffer tail variable. Process blocks 610-630 and 620-640 are repeated in parallel until execution is completed, as determined at process blocks 650 and 660, respectively.

Accordingly, process blocks 610-640 collectively illustrate lazy synchronization, wherein a leading thread operates under the presumption that data is read from a shared memory buffer or FIFO buffer according to a data unit size and a trailing thread operates according to the presumption that data is written to the shared memory buffer according to the predetermined data unit size. In one embodiment, delayed buffer enables or avoids false sharing of data, as well as hiding cache miss penalties, which are caused when the leading thread writes data to the FIFO buffer with the corresponding trailing thread attempting to read such data. At process block 670, results computed by the leading thread and trailing thread are compared. Once compared, at process block 672, it is determined whether a non-matching result is detected. When such is the case, at process block 680, a transient fault is detected within replicated application.

Figure 18:
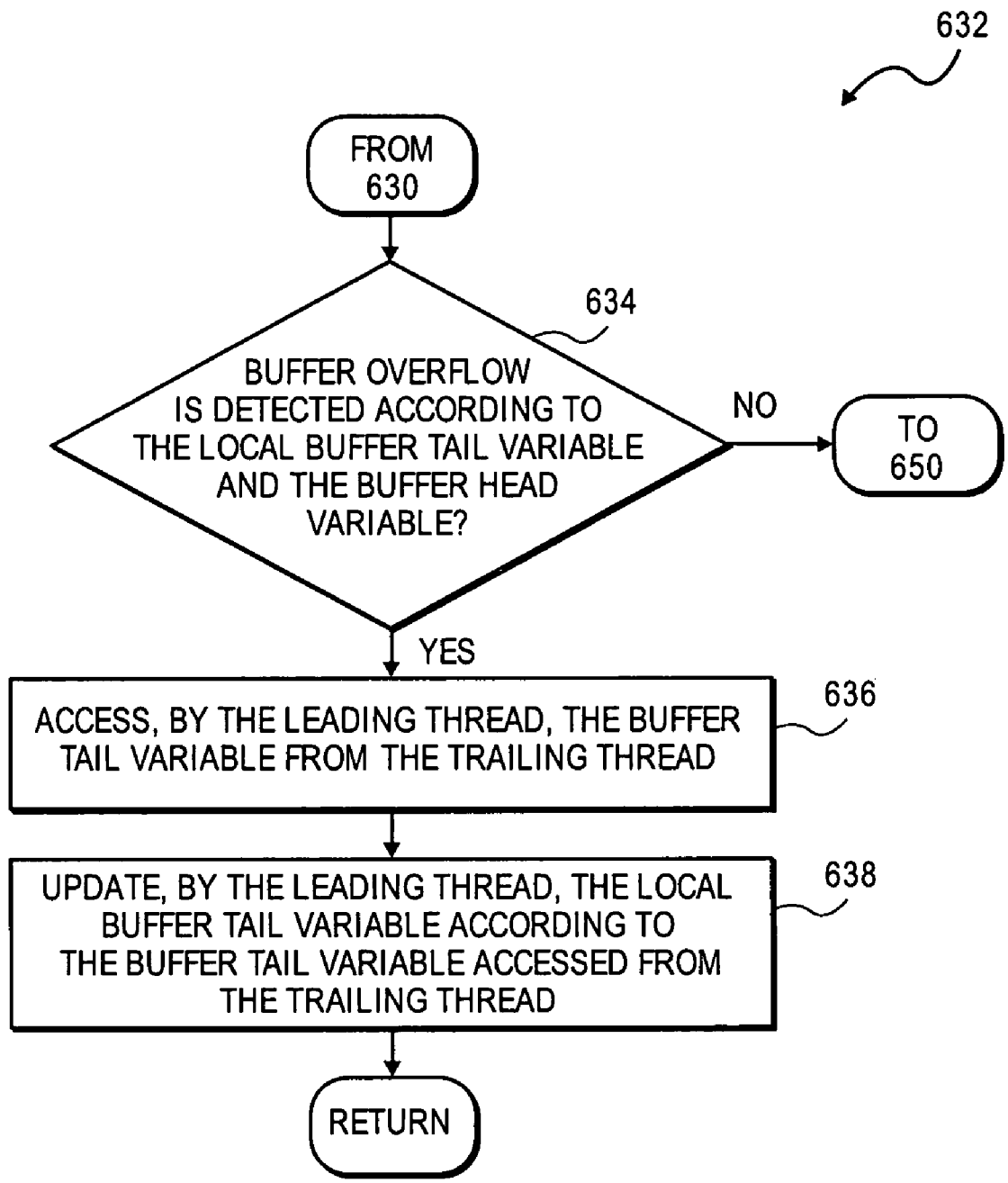
FIG. 18 is a flowchart illustrating a method for updating a buffer head variable according to a local buffer head variable to provide delayed buffering, in accordance with one embodiment.

FIG. 18 is a flowchart illustrating a method 632 for providing lazy synchronization to the delayed buffering embodiment shown in FIG. 17. Representatively, at process block 634, it is determined whether buffer overflow is detected according to a local buffer tail variable and the buffer head variable. When such is the case, at process block 636, the leading thread accesses the buffer tail variable from the trailing thread creating a data flow between the leading thread and the trailing thread. At process block 638, the leading thread updates the local buffer tail variable according to the buffer tail variable accessed from the trailing thread. Accordingly, by performing buffer underflow detection according to a local buffer tail variable, a data flow from the trailing thread to the leading thread is limited to such situations where the local buffer tail variable must be synchronized with the buffer tail variable maintained by the trailing thread.

Figure 19:
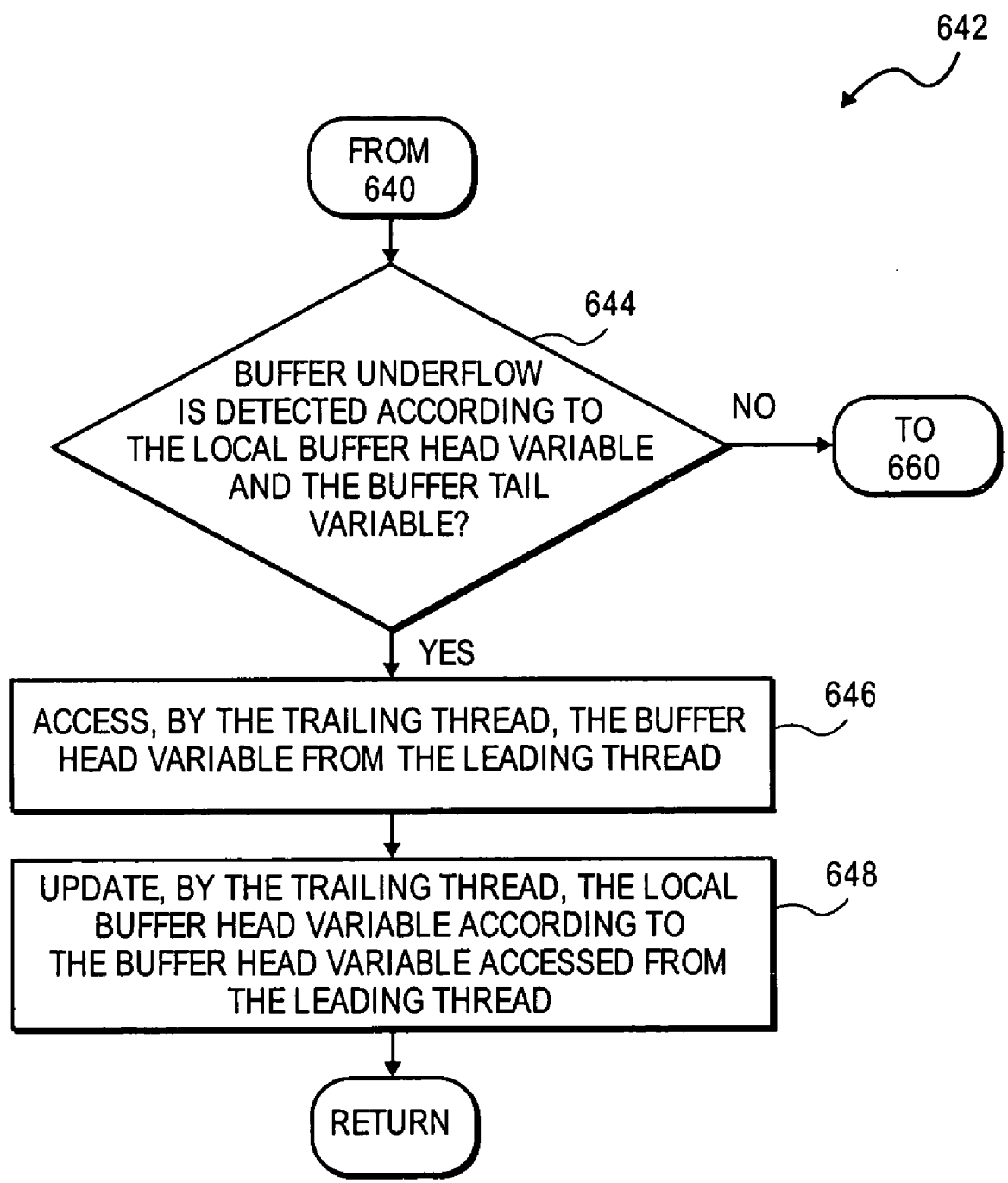
FIG. 19 is a flowchart illustrating a method for updating a buffer tail variable according to a local buffer tail variable to provide delayed buffering, in accordance with one embodiment.

FIG. 19 is a flowchart illustrating a method for providing lazy synchronization to the delayed buffering illustrated in FIG. 17, in accordance with one embodiment. At process block 644, it is determined whether buffer underflow is detected according to the local buffer head variable and the buffer tail variable. Once detected, at process block 646, the trailing thread accesses the buffer head variable from the leading thread. Subsequently, at process block 648, the trailing thread updates the local buffer head variable according to the buffer head variable accessed from the leading thread. In accordance with such an embodiment, data flows between the leading thread and the trailing thread are limited to situations where buffer overflow is detected, thereby reducing thread synchronization requirements for software redundant thread computation.

Figure 20:
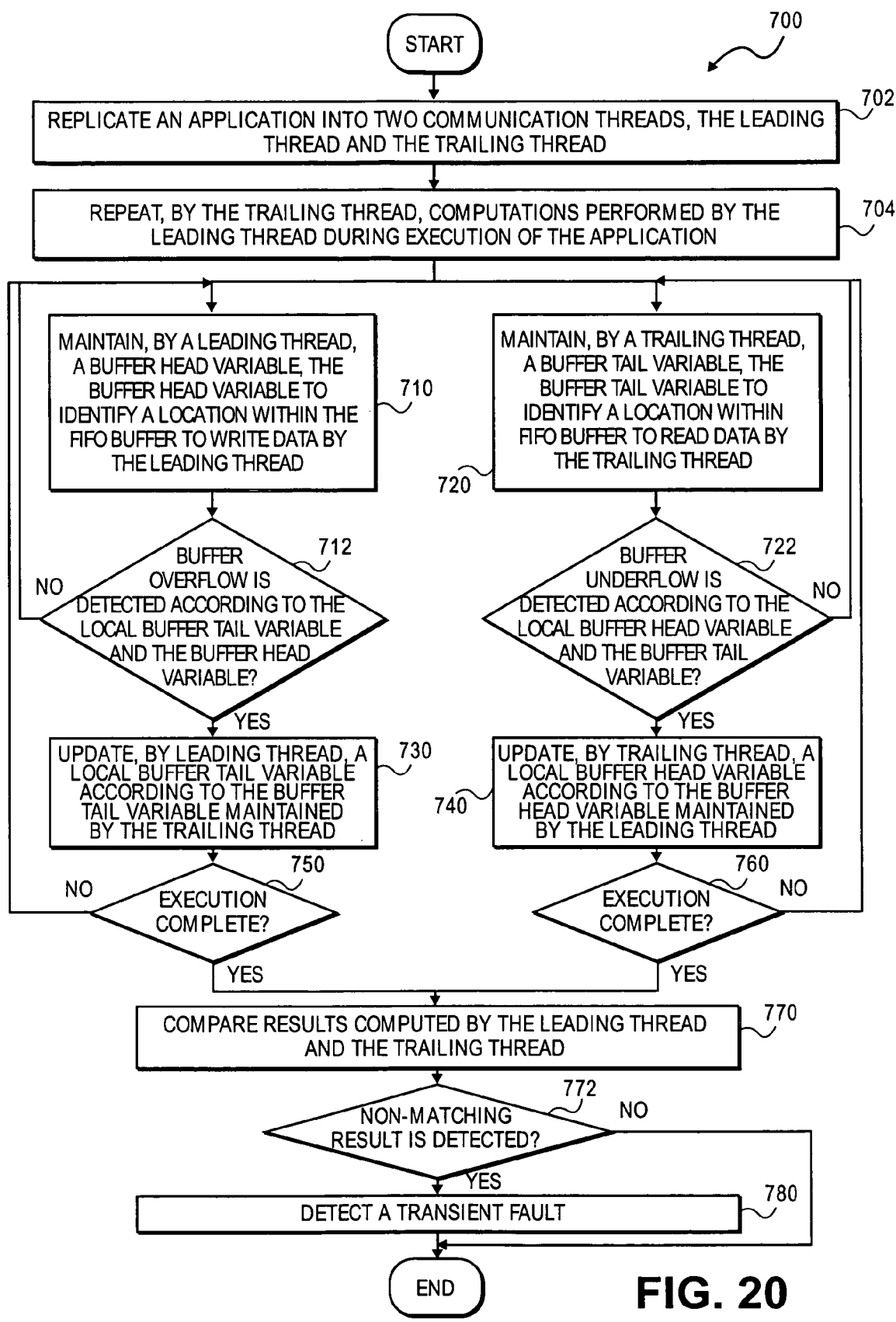
FIG. 20 is a flowchart illustrating a method for redundant software thread computation using a circular buffer with lazy synchronization, in accordance with one embodiment.

FIG. 20 is a flowchart illustrating a method for providing redundant software thread computation with lazy synchronization, in accordance with one embodiment. At process block 702, an application is replicated into two communicating threads: a leading thread and a trailing thread. At process block 704, the trailing thread repeats computations performed by the leading thread during execution of the application. Similar to the method shown in FIG. 17, operations performed by leading thread are illustrated by process blocks 710, 712, 730 and 750, whereas operations performed by the trailing thread are illustrated by process blocks 720, 722, 740 and 760.

Representatively, at process block 710, the leading thread maintains the buffer head variable. Similarly, at process block 720, the trailing thread maintains the buffer tail variable. As indicated above, the buffer head variable identifies the location within the FIFO buffer to write data by the leading thread, whereas the buffer tail variable identifies the location within FIFO buffer to read data by the trailing thread. At process block 712, it is determined whether buffer underflow condition is detected according to the local buffer tail variable and the buffer head variable. Similarly, at process block 722, it is determined whether buffer underflow is detected by the trailing thread according to the local buffer head variable and the buffer tail variable.

At process blocks 730 and 740, when such conditions are true, the leading thread updates the local buffer tail variable according to the buffer tail variable maintained by the trailing thread (process block 730), whereas at process block 740, the trailing thread updates the local buffer head variable according to the buffer head variable maintained by the trailing thread. As indicated, the delayed buffering of process blocks 710-730 and 720-740 are repeated until execution is completed at process blocks 750 and 760, respectively. Subsequently, process blocks 770-780 are performed to determine whether a transient fault is detected by the repeated computations performed by the trailing thread.

Accordingly, future increases in transistor density (e.g., for many core processors) across transient error rates dramatically increase to unacceptable levels. Accordingly, integrated circuit (IC) original equipment manufacturers (OEMs) may seek to use the above-described embodiments to reduce synchronization overhead and fault sharing in software redundant thread approaches for transient error detection. In addition, although the techniques are described with reference to transient error detection, such techniques may be used to reduce data communication overhead between threads in many core environments for future processors.

Elements of the described embodiments may also be provided as a machine-readable medium for storing the machine-executable instructions. A computer-readable storage medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards. A computer-readable transmission media may include propagation media or other type of computer-readable media suitable for storing electronic instructions. For example, embodiments described may be downloaded as a computer program which may be transferred from a remote computer (e.g., a server) to a requesting computer (e.g., a client) by way of data signals embodied in a carrier wave or other computer-readable transmission mediums via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments are defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
reserving a first in, first out (FIFO) buffer within a shared memory of a multicore chip multiprocessor (CMP) system for data communication between a leading thread and a trailing thread, including a buffer head variable to write data to the FIFO buffer and a buffer tail variable to read data from the FIFO buffer;
executing the leading thread within a first processor of the CMP system;
simultaneously executing the trailing tread within a second processor of the CMP system;
writing, by the leading thread, data to the FIFO buffer according to a local buffer head variable;
delaying the leading thread, by updating of the buffer head variable according to the local buffer head variable until an amount of data written to the FIFO buffer equals a predetermined data unit size;
reading, by the trailing thread, data from the FIFO buffer according to a local buffer tail variable; and
delaying the trailing thread, by updating of the buffer tail variable according to the local buffer tail variable until an amount of data read from the FIFO buffer equals the predetermined data unit size;
wherein prior to reserving, the method further comprises:
replicating an application into two communicating threads, the leading thread and the trailing thread;
repeating, by the trailing thread, computations performed by the leading thread during execution of the application; and
restricting the trailing thread from passing data to the leading thread.

2. The method of claim 1, further comprising:
comparing results computed by the leading thread and the trailing thread; and
detecting a transient fault if at least one non-matching result is detected.

3. The method of claim 1, further comprising:
synchronizing, by the leading thread, a local buffer tail variable with the buffer tail variable updated by the trailing thread if a buffer overflow is detected according to the local buffer tail variable and the buffer head variable; and
synchronizing, by the trailing thread, a local buffer head variable with the buffer head variable updated by the trailing thread if a buffer underflow is detected, according to the local buffer head variable and the buffer tail variable.

4. The method of claim 3, wherein synchronizing, by the leading thread, further comprising:
accessing, by the leading thread, the buffer tail variable from the trailing thread if buffer underflow is detected according to the local buffer tail variable and the buffer head variable; and
updating, by the leading thread, the local buffer tail variable according to the buffer tail variable accessed from the trailing thread.

5. The method of claim 3, wherein synchronizing, by the trailing thread, further comprises:
accessing, by the trailing thread, the buffer head variable from the leading thread if buffer overflow is detected, according to the local buffer head variable and the buffer tail variable; and
updating, by the trailing thread, the local buffer head variable according to the buffer head variable received from the leading thread.

6. A method comprising:
replicating an application into two communicating threads, a leading thread and a trailing thread, the trailing thread to repeat computations performed by the leading thread;
reserving a first in, first out (FIFO) buffer within a shared memory, of a multicore chip multiprocessor (CMP) system for passing data between the leading thread and the trailing thread, the FIFO buffer including a buffer head variable to write data to the FIFO buffer and a buffer tail variable to read data from the FIFO buffer;
executing the leading thread within a first processor of the CMP system;
simultaneously executing the trailing thread within a second processor of the CMP system; and
restricting data buffering, according to a data unit size, and thread synchronization between the leading thread and the trailing thread according to buffer overflow/underflow detection,
wherein restricting further comprises:
writing, by the leading thread, data into the FIFO buffer according to a local buffer head variable, the leading thread to delay updating of the buffer head variable according to the local buffer head variable until an amount of data written to the FIFO buffer equals a predetermined data unit size; and
reading, by a trailing thread, data from the FIFO buffer according to a local buffer tail variable, the trailing thread to delay updating of the buffer tail variable according to the local buffer tail variable until an amount of data read from the FIFO buffer equals the predetermined data unit size.

7. The method of claim 6, wherein restricting further comprises:
maintaining, by the leading thread, the buffer head variable;
maintaining, by the trailing thread, the buffer tail variable;
updating, by the leading thread, a local buffer tail variable according to the buffer tail variable maintained by the trailing thread if buffer underflow is detected according to the local buffer tail variable and the buffer head variable; and
updating, by the trailing thread, a local buffer head variable according to the buffer head variable maintained by the leading thread if buffer overflow is detected according to the local buffer head variable and the buffer tail variable.

8. The method of claim 6, further comprising:
restricting the trailing thread from passing data to the leading thread;
comparing results computed by the leading thread and the trailing thread; and
detecting a transient fault if at least one non-matching result is detected.

9. An article of manufacture having a computer-readable storage medium including associated instructions, wherein the instructions, when executed, result in the computer performing a method comprising:
executing a leading thread within a first processor of a multicore chip multiprocessor (CMP) system;
simultaneously executing a trailing thread within a second processor of the CMP system;
maintaining, by the leading thread, a buffer head variable, the buffer head variable to identify a location within a first in, first out (FIFO) buffer, located within a shared memory of the CMP system, to write data by the leading thread;
maintaining, by the trailing thread, a buffer tail variable, the buffer tail variable to identify a location within the FIFO buffer to read data by the trailing thread;
updating, by the leading thread, a local buffer tail variable according to the buffer tail variable maintained by the trailing thread if buffer underflow is detected according to the local buffer tail variable and the buffer head variable;
updating, by the trailing thread, a local buffer head variable according to the buffer head variable maintained by the leading thread if buffer overflow is detected, according to the local buffer head variable and the buffer tail variable;
writing, by the leading thread, data to the FIFO buffer according to a local buffer head variable; and
delaying, by the leading thread, updating of the buffer head variable with the local buffer head variable until an amount of data written to the FIFO buffer equals a data unit size.

10. The article of manufacture of claim 9, wherein the computer-readable storage medium further including associated instructions, wherein the instructions, when executed, further result in the machine computer performing a method comprising:
replicating an application into two communicating threads, the leading thread and the trailing thread;
repeating, by the trailing thread, computations performed by the leading thread during execution of the application; and
restricting the trailing thread from passing data to the leading thread.

11. The article of manufacture of claim 9, wherein the computer-readable storage medium further including associated instructions, wherein the instructions, when executed, further result in the computer performing, a method comprising:
comparing results computed by the leading thread and the trailing thread; and
detecting a transient fault if at least one non-matching result as detected.

12. The article of manufacture of claim 9, wherein the machine accessible medium further including associated instructions, wherein the instructions, when executed, further result in the machine performing:
reading, by a trailing thread, data from the FIFO buffer according to a local buffer tail variable; and
delaying, by the trailing thread, updating of the buffer tail variable with the local buffer tail variable until an amount of data read from the FIFO buffer equals the data unit size.

13. A multicore chip multiprocessor (CMP) system comprising:
a memory controller coupled to a memory;
a first processor coupled to the memory controller to execute an application program according to a leading thread;
a second processor coupled to the memory controller to execute the application program according to a trailing thread, the trailing thread to repeat computations performed by the leading thread; and
a first in, first out (FIFO) buffer, reserved within the memory shared between the first and second processors, including a buffer head variable to write data into the buffer and a buffer tail to read data from the buffer, the leading thread and the trailing thread to restrict data buffering within the FIFO buffer according to a data unit size, and to restrict thread synchronization between the leading thread and the trailing thread to detection of buffer overflow and buffer underflow according to a local buffer head variable and a local buffer tail variable,
wherein the leading thread is further to write data to the FIFO buffer according to a local buffer head variable and to delay an update of the buffer head variable according to the local buffer head variable until an amount of data written to the FIFO buffer equals the data unit size, and
wherein the trailing thread is further to read data from the FIFO buffer according to a local buffer tail variable and to delay an update of the buffer tail variable according to the local buffer tail variable until an amount of data read from the FIFO buffer equals the data unit size.

14. The system of claim 13, wherein the leading thread is further to maintain the buffer head variable, and to update the local buffer tail variable according to the buffer tail variable maintained by the trailing thread if buffer underflow is detected according to the local buffer tail variable and the buffer head variable.

15. The system of claim 13, wherein the trailing thread is further to maintain the buffer tail variable, and to update the local buffer head variable according to the buffer head variable maintained by the leading thread if buffer overflow is detected according to the local buffer head variable and the buffer tail variable.

* * * * *